June 19, 1951 H. T. STRANDRUD 2,557,154

STABILIZED NEGATIVE IMPEDANCE CIRCUIT

Filed March 24, 1949

HALVOR T. STRANDRUD
INVENTOR.

BY Roy C. Hackley Jr.

Patented June 19, 1951 2,557,154

UNITED STATES PATENT OFFICE 2,557,154

STABILIZED NEGATIVE IMPEDANCE CIRCUIT

Halvor T. Strandrud, Portland, Oreg., assignor to the United States of America as represented by the Secretary of the Interior Application March 24, 1949, Serial No. 83,281

2 Claims. (Cl. 178—44)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of March 3, 1883, as amended April 30, 1928 (370 O. G. 757).

This invention relates to a class of electric circuit known in the art as negative impedance circuits. These circuits can be considered, on one sense, at least, as generators of alternating current. They ordinarily comprise an electronic amplifier with feedback through a loading impedance to the input circuit. Such a circuit has the overall characteristic of supplying a current proportional to an impressed voltage in the direction opposite to that in which a current would flow into an ordinary impedance subjected to that voltage.

This characteristic is referred to in this art as the characteristic of negative impedance. Negative impedance circuits have been described in the literature, for example, by Brunetti and Greenough; "Some Characteristics of a Stable Negative Resistance," page 542, Proceedings Institute of Radio Engineers, December 1942; and by E. L. Ginzton: "Stabilized Negative Impedances," Electronics, page 140, July 1945; page 138, August 1945; and page 140, September 1945.

The circuits described in the above publications are stable under certain restricted conditions. They are unstable and will break into self-sustained oscillations at undesired frequencies unless the impedance connected across the external terminals lies within a definitely restricted range. One of the applications for which I have used negative impedances is in alternating current network analyzing equipment. The restriction on the external impedance makes the type of negative impedance circuit mentioned above useless for that particular application as well as for other applications where the external impedance is variable through a wide range.

The principal object of my invention is to provide a stabilized negative impedance circuit which is stable for wide ranges of external impedance. A correlative object is to provide such a circuit that will be free from undesired oscillations. Another object is to provide a negative impedance circuit that is adaptable to use as a component of alternating current network analyzers. What constitutes my present invention is described with reference to the drawings in the specification following and is succinctly defined in the appended claims.

Figure 2:
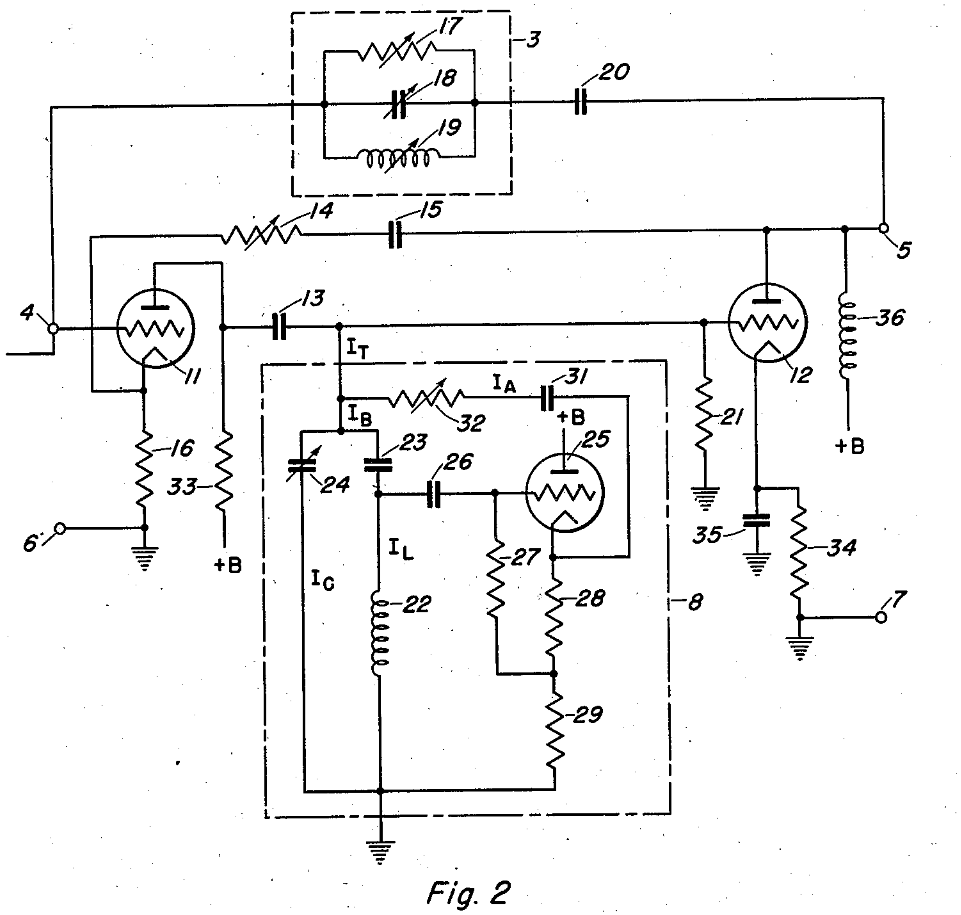
Figure 1:
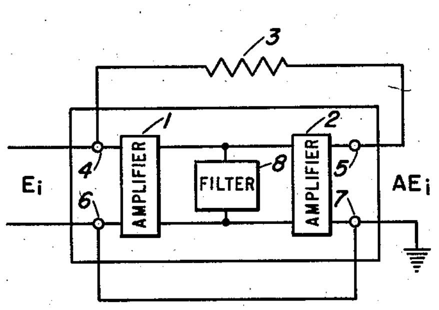
Figure 3:
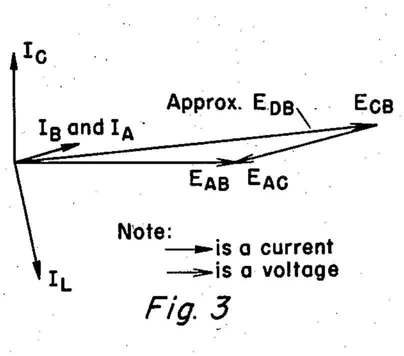

In the drawing, Figure 1 is a simplified schematic diagram illustrative of the general principle of operation of a negative impedance. Figure 2 is a diagram showing a preferred form of embodiment of my invention. Figure 3 is a vector diagram of voltages and currents in a part of Figure 2 when operating at resonant frequency.

Figure 1 is related to, but is an improvement on, the prior art. In the prior art a succession of amplifiers 1 and 2 is subjected to an input voltage $E_i$ which is amplified to an output voltage $AE_i$ in which A is the amplification factor. An impedance 3 is connected in parallel with the amplifiers 1 and 2 bridging them from the input terminal 4 to the output terminal 5.

The reference to the amplifiers as a "succession" is occasioned by the condition that the phase of the output voltage needs to be the same as that of the input. A single stage amplifier, such as a triode, delivers an output current opposite in phase to that of the input so a second stage is used to reverse the phase a second time to produce an output current in phase with the input current.

When the condition of phase is fulfilled a voltage $E_i$ impressed on the input terminals 4 and 6 causes a voltage $AE_i$ to be delivered at terminals 5 and 7. The difference voltage $(E_i-AE_i)$ is impressed on impedance 3 producing therein a current $$I=\frac{E_i-AE_i}{Z}=\frac{E_i(1-A)}{Z}$$

where Z is impedance. The apparent impedance measured at the input terminals 4 and 6 is the ratio of applied voltage to observed current which is $$\frac{E_i}{I}=\frac{E_i}{\left(\frac{E_i(1-A)}{Z}\right)}=\frac{Z}{1-A}$$

This apparent impedance is negative when A is greater than one.

Insofar as this mathematical relationship is concerned, the negative impedance of the prior art is sufficient, but in the circuits of the prior art, parasitic oscillations occur under some conditions. This difficulty is avoided by introducing filter 8 as shown in Figure 1. The action of filter 8 as well as the construction thereof is explained in reference to Figure 2.

In Figure 2, a triode vacuum tube 11 corresponds to amplifier 1 shown in Figure 1. A triode 12 corresponds to amplifier 2. Filter 8 shown in Figure 1 comprises the circuit components included inside the dot-dash line indicated by 8 in Figure 2. The input signal is introduced between terminals 4 and 6. This signal is impressed on the grid of triode 11. An amplified signal is transmitted from the plate of triode 11 through a coupling condenser 13 to the grid of the second triode 12.

Triode 12 produces a plate signal in phase with the initial input signal. The output signal of triode 12 is delivered between terminals 5 and 7. Terminals 6 and 7 are connected, as indicated, through ground which in construction is the metal chassis of the assemblage, and accordingly the output signal is impressed together with the input signal on impedance 3 as in Figure 1. The output voltage of triode 12 is impressed also on a feedback control resistor 14 through a condenser 15, and on a cathode resistor 16 connected to triode 11.

The feedback connection is conventional in theory and it is used here to decrease distortion and to make the overall amplifier gain independent of variations in vacuum tube characteristics.

Impedance 3 is developed within the dotted line in Figure 2 to include a variable resistor 17, a variable condenser 18 and a variable reactor 19. These variable elements are provided to permit the development of a negative impedance of widely varying characteristics. A condenser 20 serves, as do also condensers 13 and 15 in their respective locations, to insulate the plate direct current voltages from the grid and ground circuits.

The output signal of triode 11 is impressed on filter 8 in parallel with the grid of triode 12 and a grid resistor 21. Filter 8 is essentially a circuit tuned to the normal operating frequency of the system in which the assemblage is to be used. The frequency, for example, of network calculators with which the negative impedance is used is usually of the order of a few hundred or a few thousand cycles per second. The sharpness of the tuning at frequencies of this order due to the unavoidable resistance in the tuned circuits is not sufficient unless the effect of the resistance is compensated by energy feed-back.

Referring to the portion of Figure 2 inside the dot-dash line, the elementary tuned circuit is composed of an inductance 22, a fixed condenser 23, and a variable condenser 24. The energy feedback for resistance compensation is provided by a triode 25 receiving grid excitation through a coupling condenser 26. A grid resistor 27 and a bias resistor 28 are provided as usual in triode connections. Voltage for feedback is taken from the cathode circuit across the combination of a cathode loading resistor 29 and the bias resistor 28. Energy feedback is communicated to the tuned circuit and to the grid through a coupling condenser 31 and a variable resistor 32. The circuit is tuned by adjustment of condenser 24 and the feedback is controlled by adjustment of resistor 32.

When filter 8 is properly tuned and adjusted for sufficient feedback, a signal from triode 11 impressed on a plate loading resistor 33 is communicated to the grid of triode 12, and impressed on the tuned circuit of filter 8. The impedance of filter 8 is very low except to currents of the frequency to which it is tuned. This by what is in effect a short circuit decouples the plate of triode 11 from the grid of triode 12 except for the desired frequency of operation. Thus the system is prevented from incurring self-sustained oscillations of any frequency other than the selected frequency of the system in which the circuit is being used. Uncontrolled oscillation at the tuned frequency is avoided in normal operation by the damping effect of the external circuit connected to terminals 4 and 6. The value of the impedance of the external circuit is not critical but there may be values of impedances at terminals 4 and 6 which will permit uncontrolled oscillation of the negative impedance circuit. The values of external circuit impedance will usually be of the same order of magnitude as, or less than, the impedance 8. Under the usual working conditions the circuit as shown in Figure 2 is stable.

In connection with triode 12, there is a conventional bias resistor 34 and bypass condenser 35. Plate current is delivered to triode 12 through a reactor which prevents the alternating component of plate current from flowing in the direct current power supply. The conventional connections to plate current sources are indicated in Figure 2 by +B. Filament connections and other conventional details pertaining to the triodes 11, 12, and 25 have been omitted for convenience.

Referring in more detail to the filter circuit 8 inside the dot-dash line in Figure 2, this circuit could be replaced by any other type of filter sharply selective at the specified frequency of operation of the negative impedance circuit. This limitation of sharp selectivity severely restricts the choice of type of filter because of the low frequency of the currents involved. There may be filters in this art having feedback to increase selectivity but the filter shown in Figure 2 has novel advantages over the filters of the known art. The operation of this filter is explained further with the aid of the vector diagram, Figure 3, and the current notations in Figure 2.

A voltage $E_{AB}$ across the filter circuit causes a current $I_C$ to flow in condenser 24 and a current $I_L$ to flow in condenser 23 and inductance 22 in series. The current in condenser 23 is practically equal to the current in inductance 22 inasmuch as the impedance of the grid circuit of triode 25 including condenser 26 and resistor 27 is high compared with that of inductance 22. Current $I_B$ is the sum of currents $I_C$ and $I_L$.

The output of triode 25 is a voltage $E_{DB}$ which is approximately equal to the input voltage $E_{CB}$. A voltage across resistor 32 is produced as the difference between the voltages $E_{DB}$ and $E_{AB}$. The difference voltage ($E_{DB}-E_{AB}$) produces a current $I_A$ in phase with current $I_B$. The impedance of condenser 31 is made low so as to have negligible voltage drop when carrying current $I_A$. Resistor 32 is adjusted so that $I_A$ and $I_B$ are equal. Then current $I_T$ becomes zero since $I_T$ is the difference between $I_B$ and $I_A$. Establishing the condition of $I_T=0$ is equivalent to making the impedance of the filter infinite at the frequency at which the adjustment is made.

For any other frequency, $I_A$ and $I_B$ are not equal, current $I_T$ is not zero and the apparent impedance of the filter is not infinite. The rate of change of $I_A$ and $I_B$ from equality is very high with small departures from the frequency to which the system has been tuned, and therefore the filter is highly selective.

In further reference to impedance 3, any combination of resistance, inductance, or capacitance desired is feasible within a wide range of permissible values. Other details of the circuit as disclosed may be changed subject to the usual characteristics of thermionic tube circuits such as increasing the number of stages of amplification.

I claim:

1. In a frequency-selective filter the combination of a closed tunable circuit of an inductance, a fixed capacitance and a variable capacitance grounded between said inductance and said variable capacitance, a triode whose input circuit is connected in parallel with said inductance, a grounded loading resistor in the cathode circuit of said triode connected in parallel with said variable capacitance through a connection including a series capacitance and a variable resistance, and means for connecting said filter to an external circuit through ground and a point between said fixed capacitance and said variable capacitance.

2. In a frequency-selective filter circuit the combination of a tuned closed circuit comprising an inductance and two condensers in series, a connection for an external circuit between the said two condensers, a connection to ground between said inductance and one of the said two condensers, a triode whose grid input circuit is connected in parallel with said inductance, a loading resistor in the cathode circuit of said triode and a connection including a third condenser and a resistance in series between the cathode of said triode and said connection between said two condensers in said tuned circuit.

HALVOR T. STRANDRUD.

REFERENCES CITED

The following references are of record in the file of this patent:

UNITED STATES PATENTS

| Number | Name | Date |
|---|---|---|
| 1,837,851 | Chisholm | Dec. 22, 1931 |
| 1,994,457 | Barnes | Mar. 19, 1935 |
| 2,197,239 | Farrington | Apr. 16, 1940 |
| 2,250,277 | Schaper | July 22, 1941 |
| 2,268,672 | Plebanski | Jan. 6, 1942 |
| 2,359,504 | Baldwin | Oct. 3, 1944 |